G. HIPWOOD.
FISH ROD HOLDER.
APPLICATION FILED SEPT. 24, 1915.
1,174,319.
Patented Mar. 7, 1916.
2 SHEETS—SHEET 1.
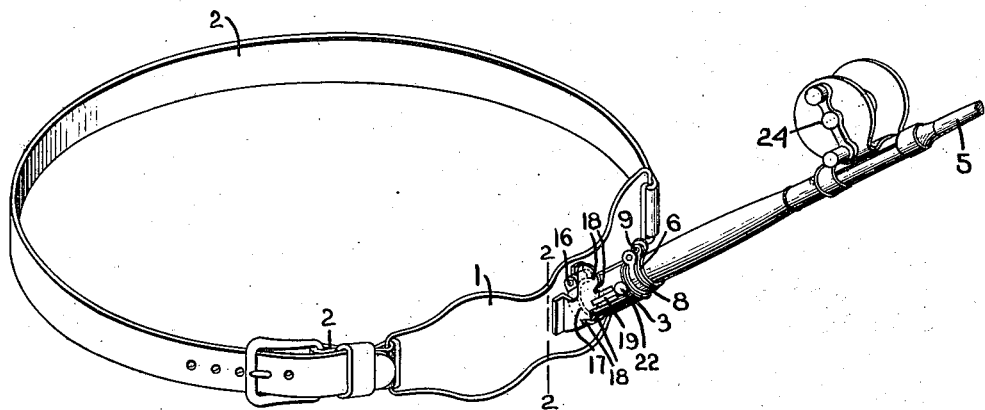
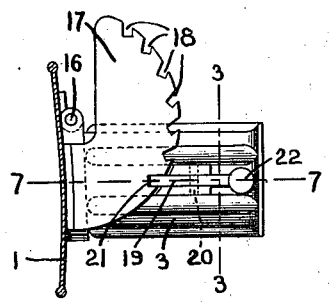
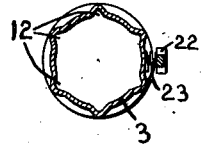
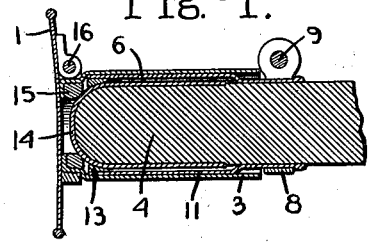
Inventor.
George Hipwood
by Heard Smith & Tennant.
Attys.

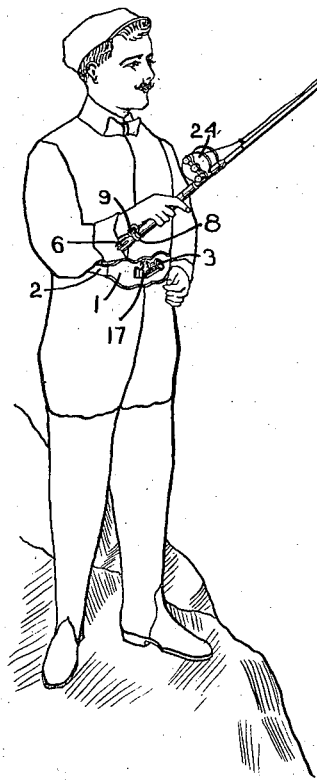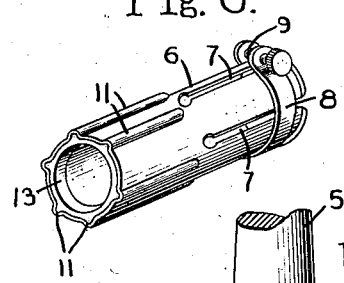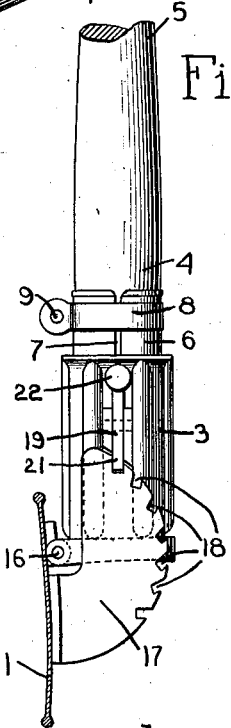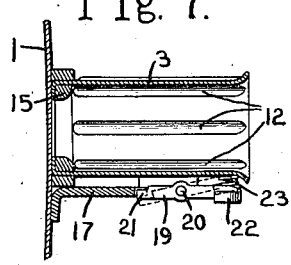

UNITED STATES PATENT OFFICE.

GEORGE HIPWOOD, OF BOSTON, MASSACHUSETTS.

FISH-ROD HOLDER.

1,174,319.  Specification of Letters Patent.  Patented Mar. 7, 1916.

Application filed September 24, 1915. Serial No. 52,495.

*To all whom it may concern:*

Be it known that I, GEORGE HIPWOOD, a citizen of the United States, residing at Boston, county of Suffolk, State of Massachusetts, have invented an Improvement in Fish-Rod Holders, of which the following description, in connection with the accompanying drawing, is a specification, like characters on the drawing representing like parts.

This invention has for its object to provide a novel fish rod holder for the use of fishermen by which the fish rod can be firmly held while a fisherman is trawling or reeling in his line, thus relieving the fisherman of the labor involved in holding the fish pole firmly by the hand alone during this operation.

When a fisherman is trawling by reeling up his line it is the common practice for him to place the end of the fish pole against his body and to hold the fish pole with his left hand, while with his right hand he turns the reel. The operation of turning the reel tends to twist the fish pole about its longitudinal axis first in one direction and then the other as the reel is turned, and this tendency has to be resisted by a firm grip with the left hand. Further, if there is more or less resistance and especially uneven resistance to the reeling-up of the line, it is difficult to hold the butt end of the fish pole firmly in position against the body as any jerky or uneven motion is likely to throw the fish pole out of position.

It is the object of my invention to provide a novel fish pole holder which can be attached to a person's body and which will firmly hold the butt end of the fish pole in proper position and prevent it from twisting so that when the fish pole is held by the holder, the trawling operation can be carried out easily and without any liability of the fish pole becoming thrown out of proper position. My improved fish pole holder is also constructed so that it will hold the fish pole firmly at different angles, and has other advantages, all as will be more fully hereinafter described.

In order to give an understanding of my invention I have illustrated in the drawings a selected embodiment thereof which will now be described, after which the novel features will be pointed out in the appended claims.

In the drawings, Figure 1 is a perspective view of my improved holder showing the butt end of a fish pole held in position thereby. Fig. 2 is a section one the line 2—2, Fig. 1; Fig. 3 is a section on the line 3—3, Fig. 2; Fig. 4 is a longitudinal sectional view through my improved holder. Fig. 5 is a view showing the manner in which my improved fish rod holder is worn by a fisherman; Fig. 6 is a perspective view of the sleeve that is secured to the end of the fish rod; Fig. 7 is a section on the line 7—7, Fig. 2; Fig. 8 is a view similar to Fig. 2 but showing the socket member thrown into vertical position and with the end of the fish rod therein.

My improved fish rod holder comprises a belt member adapted to be strapped around the body of the fisherman, a socket member secured to the belt member and into which the butt end of the fish pole can be inserted, and means providing an interlocking engagement between the fish rod and the socket member which will prevent the fish rod from turning about its axis in the socket and will assist in holding the fish rod in proper position. The belt member is herein shown as comprising the body portion 1, which will preferably be of metal and have a shape to conform to a person's body, and attaching straps 2 secured to the body 1 and by which the latter may be strapped about the body of the fisherman. The socket member is shown at 3 and it is secured to the body 1 and is adapted to receive the butt end 4 of a pole 5.

In order to adapt my invention for use in connection with any fish pole, I provide a sleeve 6 which is adapted to be clamped to the butt end of the fish pole and is of a size to be inserted into the socket 3, said sleeve and socket being constructed to interlock with each other so as to prevent turning movement of one relative to the other. This sleeve 6 is shown as split at one end, as at 7, and said end has a clamping ring 8 applied thereto which can be tightened about the sleeve by a clamping screw 9. The sleeve is slipped over the butt end 4 of the fish pole 5 and is firmly clamped thereto by tightening the clamping screw 9. This sleeve is shown as provided with a plurality of ribs 11 which are adapted to engage in grooves 12 formed in the socket 3 so that when the sleeve is inserted into the socket, as shown in the drawings, the sleeve will be prevented from turning in the socket. The end of the sleeve is provided with an elastic cushion member 13 against which the rounded end of the handle 4 of the fish rod seats, said fish rod projecting through the sleeve somewhat, as shown at 14. The socket member 3 has at its inner end an annular seat member 15 of rubber or similar material onto which the end 14 of the fish pole handle seats when the fish pole is inserted into the holder. With this construction the fish pole will be firmly seated in the socket and will be rigidly held therein and will be prevented from turning about its axis.

I have herein shown a construction whereby the socket member 3 can be placed at different angles relative to the belt body, according to the desires or requirements of the fisherman. While this object may be attained in various ways, I have illustrated a construction in which the socket member 3 is hinged to the body 1 at 16, so that it can be swung about the pivot 16 into different angular positions. For holding the socket member in any desired adjusted position I have provided the body member 1 with the flange 17 extending therefrom at one side of the socket member, which flange is provided with a plurality of locking notches 18 that are adapted to coöperate with a locking latch 19 carried by the socket member. This latch 19 is shown as pivotally mounted on the socket member 3 as at 20 and is provided with the nose 21 adapted to enter any one of the notches 18, and with the thumb-piece 22 by which the nose can be released from the notch. This locking latch 19 will preferably be acted upon by a spring 23 which will hold it in its proper operative position. By this means the fish pole can be held at any desired angle.

My invention does not interfere at all with the ordinary use of the fish pole, for when it is not necessary to use the holder, the fish pole can be removed from the socket 3 and then used in the ordinary way. The presence of the sleeve 6 on the end of the fish pole does not interfere in any way with its ordinary use. Whenever during the fishing operation, the fisherman desires to hold the fish pole in position while he is operating the reel 24, the end of the fish pole can be quickly inserted into the socket, and when in position will be firmly held at the desired elevation and also firmly held from oscillating about its axis as the reel 24 is operated.

The provision by which the socket member 3 can be thrown into the vertical position shown in Fig. 8 and locked therein has many advantages. For instance, it is a great convenience when a fisherman is baiting his hook, for he can then swing his fish rod into the vertical position shown in Fig. 8 and then lock it in such position, after which both of his hands will be free for baiting the hook. So also if a fisherman desires to have a hasty lunch, he can swing the fish pole into the vertical position out of the way and lock it in such position and then have both hands free with which to eat and drink. It is also an advantage in other ways because it permits him to hold his fish pole without using his hands, thus allowing the free use of his hands for other purposes.

While I have herein illustrated a selected embodiment of my invention, I do not wish to be limited to the constructional features shown.

I claim:

1. In a fish rod holder, the combination with a belt member adapted to be applied to a person's body, of a socket member secured to said belt member, and a sleeve adapted to be applied to the end of a fish rod and having a size to fit into said socket, said sleeve and socket being constructed to interlock with each other to prevent turning of the sleeve in the socket.

2. In a fish rod holder, the combination with a belt member adapted to be applied to a person's body, of a socket member secured to said belt member, and a sleeve adapted to be applied to the end of a fish rod and having a size to fit into said socket, said sleeve and socket having interengaging ribs and grooves which prevent the sleeve from turning in the socket.

3. In a fish rod holder, the combination with a belt member adapted to be applied to a person's body, of a socket member connected to the belt member for adjustment into different angular positions and adapted to receive the end of a fish rod, a notched locking plate extending from the body member, and a locking latch carried by the socket member and adapted to engage with one of the notches of said plate to hold the socket member in adjusted position.

4. In a fish rod holder, the combination with a belt member adapted to be applied to a person's body, of a socket member secured to the belt member and provided at its inner end with an annular resilient seat, a sleeve adapted to receive the end of a fish pole and of a size to fit into said socket, said sleeve having at its inner end an annular resilient seat.

5. In a fish rod holder, the combination with a belt member adapted to be applied to a person's body, of a socket member secured to the belt member and provided at its inner end with an annular resilient seat, a sleeve adapted to receive the end of a fish pole and of a size to fit into said socket, said sleeve having at its inner end an annular resilient seat, and said sleeve and socket member having interengaging ribs and grooves to prevent the sleeve from turning in the socket.

6. A sleeve for use in a fish rod holder, said sleeve being split at one end and adapted to be inserted over the end of a fish rod, an annular rubber seat at the other end of the sleeve against which the end of the fish rod rests, and a clamping ring embracing the split end of the sleeve for clamping the latter to the fish rod, said sleeve having ribs extending longitudinally thereof.

In testimony whereof, I have signed my name to this specification.

GEORGE HIPWOOD.